April 29, 1947. C. R. RAFFIELD 2,419,916
PIPE OR HOSE COUPLING
Filed April 1, 1946 2 Sheets-Sheet 1
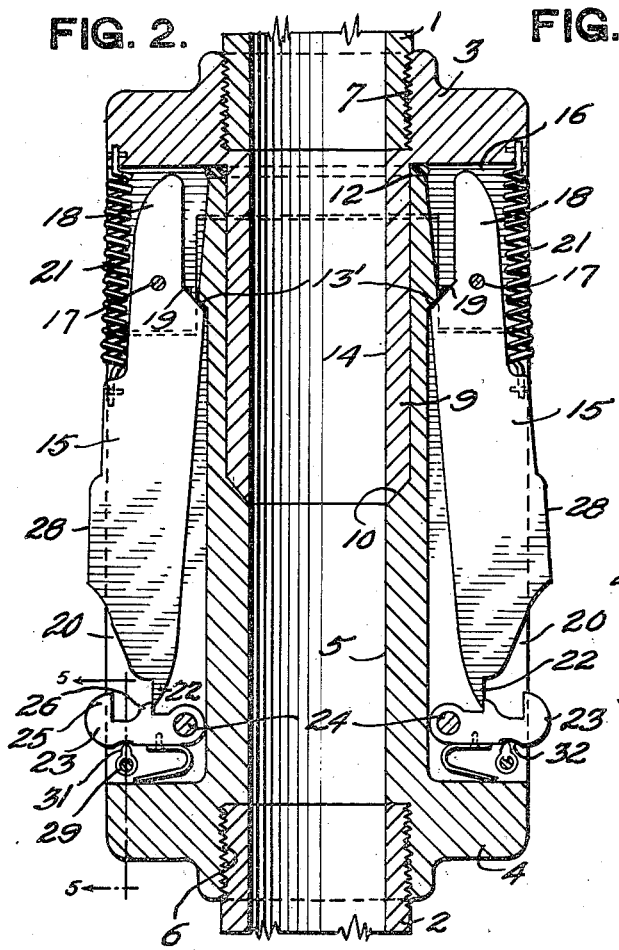
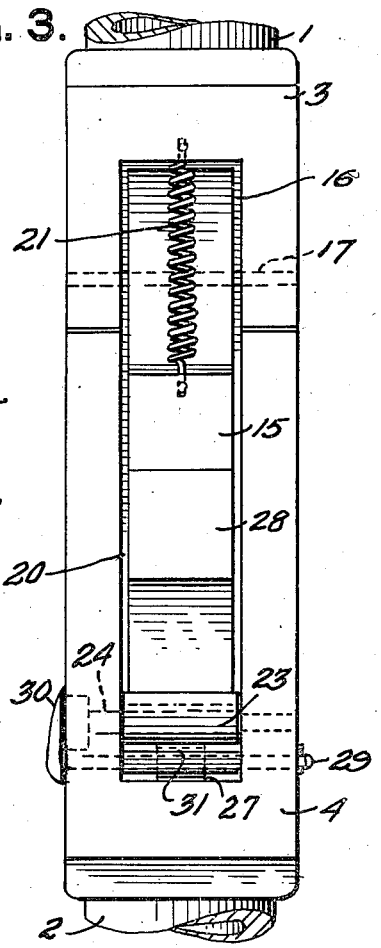
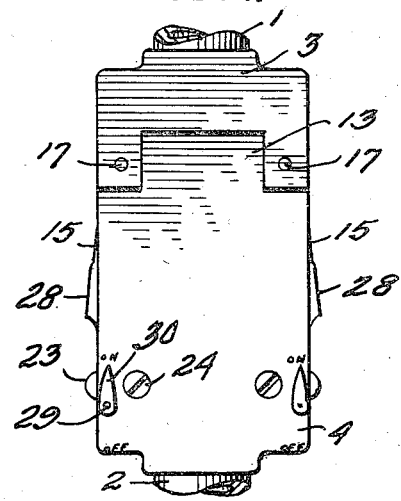
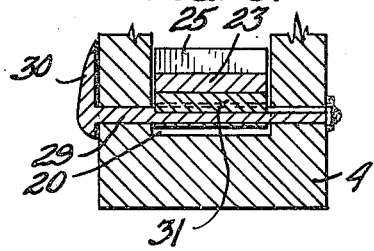
INVENTOR.
Clyde R. Raffield
BY Lancaster, Allwine & Rommel
ATTORNEYS.

April 29, 1947.   C. R. RAFFIELD   2,419,916
PIPE OR HOSE COUPLING
Filed April 1, 1946   2 Sheets-Sheet 2

INVENTOR.
Clyde R. Raffield
BY Lancaster Allwine Rommel
ATTORNEYS.

Patented Apr. 29, 1947

2,419,916

UNITED STATES PATENT OFFICE 2,419,916

PIPE OR HOSE COUPLING

Clyde R. Raffield, Port St. Joe, Fla.

Application April 1, 1946, Serial No. 658,694

6 Claims. (Cl. 285—173)

This invention relates to a coupling which may be used to connect sections of pipe and/or hose and it is one object of the invention to provide a coupling consisting of companion male and female sections adapted to be thrust into engagement with each other and firmly held against accidental displacement.

Another object of the invention is to provide a coupling wherein the male section includes levers which are moved inwardly into abutting engagement with shoulders about the female section and engaged by latches so that the levers will be securely held in recesses formed in the female section and a water tight connection provided.

Another object of the invention is to provide a coupling wherein the levers are partially moved towards a securing position when the male section and the female section are thrust into engagement with each other, pressure being then applied to the levers to complete their movement to a securing position by grasping the coupling and pressing fingers against outer free end portions of the levers.

Another object of the invention is to provide a coupling wherein the levers and the latches are urged towards a normal position by springs, keepers being provided for holding the latches in securing engagement with the levers so that the levers will not accidentally move towards a releasing position and allow the coupling sections to slip out of tight sealing engagement with each other.

Another object of the invention is to provide a coupling so shaped that it has flat side faces and may be drawn along the ground without turning and moving the keepers into position for contact with stones or other obstructions which might move them out of securing engagement with the latches.

Another object of the invention is to provide a coupling wherein the male unit may have a plug coupled to it for temporarily blocking its water passage and allowing repairs to be made without shutting off water at the main source.

Another object of the invention is to provide a coupling which is of simple construction and very efficient in operation.

The invention is illustrated in the accompanying drawings wherein:

Fig. 1 is a view looking down upon the improved coupling.

Fig. 2 is an enlarged sectional view taken longitudinally through the coupling.

Fig. 3 is an enlarged side view of the coupling.

Fig. 5 is a fragmentary sectional view taken along line 5—5 of Figure 2.

Figure 4:
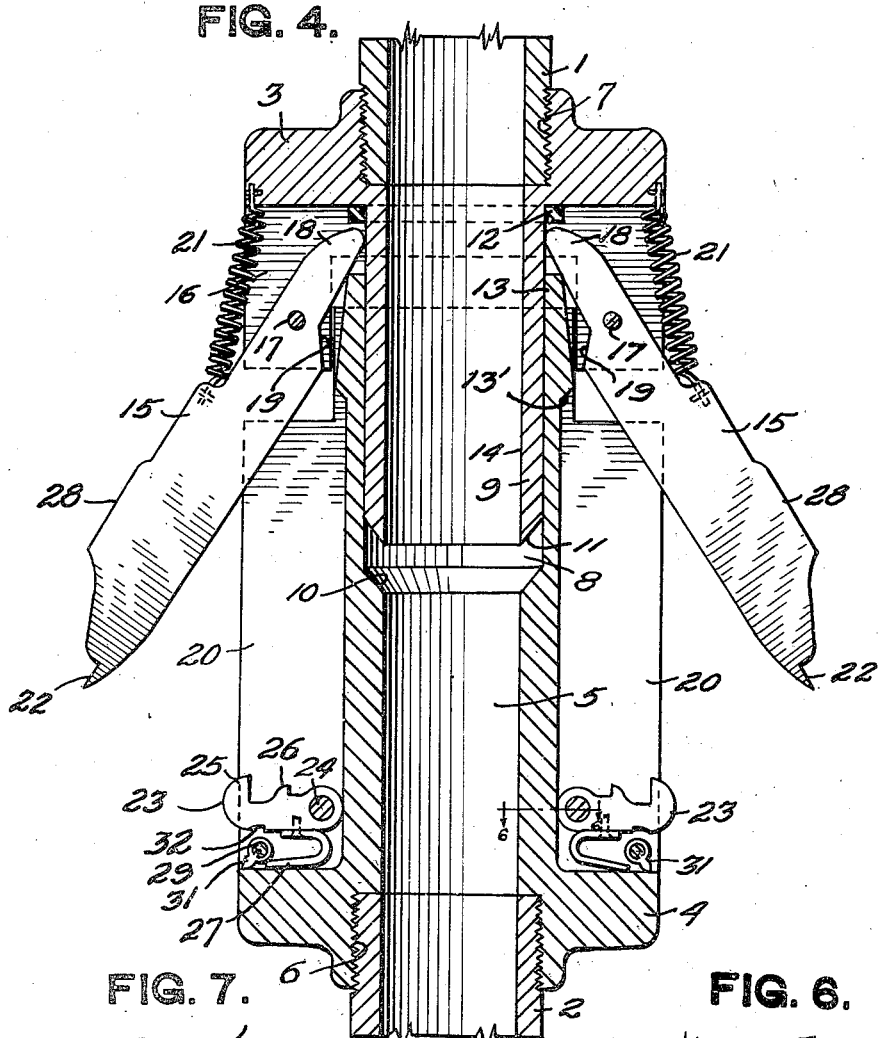
Fig. 4 is a sectional view similar to Figure 2 but showing the levers in an extended position.

This improved coupling may be used for connecting pipe or hose units and in the drawings the members 1 and 2 may represent pipes or the terminals of hose units, it being understood that the member 1 could be an outlet neck for a fire plug or the like. They will for convenience be referred to hereafter as pipes. The male section 3 of the coupling is applied to pipe 1 and the female section 4 to pipe 2, and referring to Figures 2 and 4 it will be seen that the female section is formed with a longitudinally extending bore or water passage 5 having its rear end portion enlarged and threaded to form a socket 6 to receive the threaded end of the pipe 2 and the male section is formed with a threaded socket 7 to receive pipe 1. The forward portion of the water passage 5 is of increased diameter to form a pocket 8 into which the plunger 9 of the male section fits, and referring to Figure 4 it will be seen that the pocket 8 has its inner end formed with a bevelled shoulder or seat 10 about the bore 5 while the plunger has its end ground to form a bevelled edge 11 which fits tightly against the seat or shoulder to provide a ground joint when the two sections are secured tightly together as shown in Figure 2. A washer 12 fits about the plunger 9 against the body portion of the section 3 for engagement by the front end of a nose 13 of section 4 and from an inspection of Figure 2 it will be seen that when the two sections are secured in tight fitting engagement with each other leakage will be very effectively prevented when water is flowing from pipe 1 through the bore 14 of the plunger 9 and the water passage 5 and outwardly through pipe 2.

In order to hold the coupling sections 3 and 4 together and apply pressure to the gasket 12 there have been provided levers 15 which extend longitudinally of the section 3 and are pivotally mounted in recesses or pockets 16 formed in opposite side faces of the body portion of the section 3. The levers are pivotally mounted by pins 17 which are spaced from the inner ends of the levers to provide the levers with heels 18 and these heels are of reduced width so that the levers are formed with shoulders 19 for engaging shoulders 13' at opposite sides of the nose 13 of section 4 when the levers are swung into the pockets 20 formed longitudinally of section 4 in opposite side faces thereof. These levers are urged outwardly to a normally extended position as shown in Fig. 4, by springs 21 extending longitudinally of the levers and secured at their ends to the levers and to the body portion of section 3, and at their free ends the levers are provided with teeth 22 having longitudinally curved inner surfaces and flat outer surfaces. Latches 23 are pivotally mounted in rear end portions of the pockets 20 by screws 24 serving as pivot pins for the latches and each latch has an outer bill 25 and an inner bill 26 projecting from its forward side face. Springs 27 which are secured against rear side faces of the latches urge the latches forwardly and when the section 4 is thrust into engagement with the section 3 and the nose 13 engages the heels of the levers, pressure exerted upon the heels will swing the levers from the extended position of Figure 4 towards the position shown in Figure 2. As the levers swing into the pockets 20 the curved inner surfaces of the teeth 22 engage the arcuate outer end faces of the latches and move the latches rearwardly so that the teeth may pass the bills 25 and engage across the inner faces of these bills. The latches will thus hold the levers moved inwardly. The section is then grasped from opposite sides and pressure applied to the portions 28 of the levers and the teeth 22 will be snapped past the bills 26 so that the bills 26 hold the levers in fully retracted or operative position shown in Figure 2. During movement of the levers from bills 25 into position for engagement by bills 26 the shoulders 19 engage across the shoulders 13' of the nose 13 and pressure exerted by the levers will force the nose tightly against the gasket 12 and also bring the ground edge face 11 of the plunger 9 tightly against the shoulder 10. This will form a water tight joint between the two sections and leakage will be prevented.

Pins 29 having turning heads 30 are rotatably mounted through the body portion of the section 4 with portions passing transversely through the pockets 20 between the latches and the rear ends of the pockets and these pins or shafts carry keepers 31 which turn with the pins from the position shown in Figure 4 to the operative position of Figure 2 where they bear against rear side faces of the latches and prevent the latches from being moved to a releasing position. Notches 32 are formed in the latches to receive the keepers and each is curved longitudinally and has an abrupt inner end wall so that while the keepers may be turned to an inoperative position or an operative position they may not be turned too far when swung towards the operative position.

When the coupling section 4 is to be detached from section 3 rearward pressure is applied to the protruding ends of the latches after the keepers have been moved to the inoperative position and the springs 21 will swing the levers outwardly towards the extended position and pull may then be exerted upon the section 4 to draw it away from the section 3.

Figure 7:
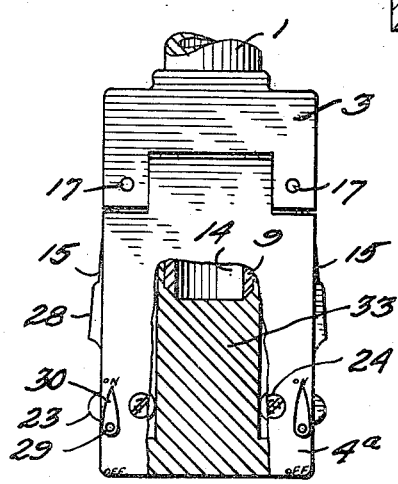
Fig. 7 is a view showing the coupling partially in section with a plug fitted into the male section.
Figure 6:
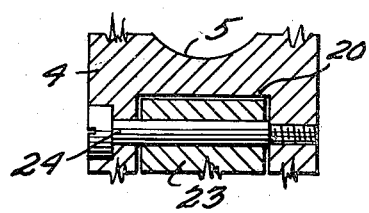
Fig. 6 is a sectional view taken along line 6—6 of Figure 4.

When it is desired to make repairs to the pipe or hose 2 or remove it for other reasons without shutting off the source from which water flows through the pipe or hose 1 the section 4 is detached from section 3 and a section 4a applied. This section 4a is in most respects similar in construction to the section 4 and corresponding parts are indicated by the same references, but upon referring to Figure 7 it will be seen that the section 4a has a solid portion 33 serving as a closure for the end of the plunger 9 of the section 3.

I claim:

1. A pipe coupling comprising a male section and a female section, the female section being formed with a nose at its front end and with a water passage extending longitudinally through the said section and the nose thereof, the forward portion of the water passage being of increased diameter to provide a circumferentially extending bevelled shoulder, the nose being formed externally at opposite sides with shoulders and the body portion of the female section being formed at opposite sides with longitudinally extending pockets, latches in said pockets pivotally mounted adjacent their rear ends and having forward faces provided with inner and outer bills, springs urging the latches forwardly towards an operative position, keepers in rear end portions of said pockets movable into and out of position to secure the latches in the operative position, the male section having a body formed with a tubular plunger and with recesses at opposite sides thereof aligned with the pockets of the female section when the plunger is fitted into the water passage thereof, levers pivoted in the recesses and having inner end portions formed with heels and with shoulders for overlapping engagement with the shoulders of the nose when the levers are tilted from an extended position into the pockets by engagement of the front end of the nose with the heels, said levers having their free ends formed with teeth for engaging under the outer and then the inner bills of the latches when the female section is thrust into place and pressure then applied to the latches to force their teeth into engagement with the inner teeth, a gasket about said plunger compressed by the end of the nose to form a tight joint about the plunger, and springs in the recesses secured at their ends to the levers and the body portion of the male section and urging the levers outwardly when the latches are moved to a releasing position.

2. A coupling comprising companion male and female sections, the male section having a body and a tubular plunger and being formed with recesses at sides of the plunger, a gasket fitting about the inner end of the plunger, levers pivotally mounted in said recesses and having teeth at their free outer ends, springs normally holding the levers in an extended position, the female section having a body and a nose at its front end and being formed with longitudinal pockets at sides of the nose and with a water passage extending longitudinally through its body and nose, a shoulder being formed intermediate the length of the water passage for engagement by the plunger when the female section is applied to the male section with the plunger fitted into the water passage and the levers swung into the pockets by engagement of the nose with inner ends of the levers and shoulders of the nose overlapped by companion shoulders on the levers, and latches pivoted in outer end portions of the pockets and yieldably urged forwardly to an operative position and having front faces provided with outer bills for initially engaging teeth of the levers and with inner bills for engaging the teeth of the levers and holding the levers in the pockets with the nose bearing against and compressing the gasket to form a tight joint between the nose of the plunger.

3. A coupling comprising companion male and female sections, the male section having a body and a tubular plunger projecting therefrom, a gasket about the inner end of said plunger, levers pivotally mounted at sides of the plunger and each having its inner end portion formed with a heel and an abutment, springs yieldably holding the levers in an extended position projecting laterally from the body, the female section having a body and a nose at the front end thereof and being formed with longitudinally extending pockets in side portions and with a water passage extending longitudinally through its body and nose, the nose having abutments overlapped by the abutments of the levers when the levers are swung into the pockets by engagement of the nose with the heels at inner ends of the levers, and latches in rear portions of the pockets urged forwardly to an operative position and having outer bills for initial engagement with free ends of the levers and inner bills for overlapping ends of the levers and holding the levers when pressed into the pockets after engagement with the outer bills and holding the levers in a fully retracted position with their abutments holding the nose in compressing engagement with the gasket.

4. A coupling comprising male and female sections, the male section having a body and a tubular plunger projecting therefrom, a gasket about the plunger, levers pivotally mounted at sides of said plunger and urged towards an extended posion laterally from the plunger, the female section having a body formed with a longitudinal water passage and with pockets at sides thereof for receiving the levers when the plunger is forced into the water passage and the levers swung inwardly by engagement of the front end of the female section with inner ends of the lever, the levers when pressed fully into the pockets having overlapped engagement with portions of the female section and forcing the female section into compressing engagement with the gasket to form a tight joint, and latches in the pockets for engaging ends of the levers and holding the levers against outward movement.

5. A coupling comprising male and female sections, the female section being formed with a water passage and the male section having a tubular plunger fitting snugly into the water passage of the female section, a gasket about said plunger, levers pivoted to the male section and urged towards an extended position laterally of the plunger, heels at inner ends of the levers bearing against side portions of the plunger when the levers are in the extended position, the levers being swung towards a retracted position by engagement of the heels by the end of the female section when the plunger is forced into the water passage, the levers when pressed to a fully retracted position having overlapping engagement with positions of the female section to securely hold the sections together and maintain the female section in compressing engagement with the gasket to form a tight seal about the plunger, and means for releasably holding the levers in a retracted position.

6. A coupling comprising companion sections having flat side faces, a first section being formed with a water passage and the second section having a tubular plunger fitting snugly in the water passage, levers pivoted to the second section for movement from an extended position to a retracted position and when retracted having overlapping engagement with the first section to releasably hold the sections together, and latches for releasably holding the levers in a retracted position urged towards a lever engaging position for automatic engagement with the levers when the levers are moved towards a retracted position and having sides presented towards the levers formed with inner and outer teeth for engaging the levers.

CLYDE R. RAFFIELD.

REFERENCES CITED

The following references are of record in the file of this patent:

UNITED STATES PATENTS

| Number | Name | Date |
|---|---|---|
| 80,820 | Forester | Aug. 11, 1868 |
| 1,461,958 | Arnold | July 17, 1923 |
| 781,952 | Janes | Feb. 7, 1905 |
| 1,130,140 | Brubaker | Mar. 2, 1915 |